2,902,500
PRODUCTION OF MONO-ESTERS

Malcolm Kent Smith, Westfield, N.J., assignor to The Baker Castor Oil Company, Jersey City, N.J., a corporation of New Jersey No Drawing. Application May 8, 1958
Serial No. 733,809

9 Claims. (Cl. 260—410.6)

This invention relates to the production of monoesters of hydroxy fatty acids with polyhydric alcohols by a process of alcoholysis. Such esters and their acylated derivatives have great utility as plasticizers for natural and synthetic rubbers and resinous materials.

Prior art reactions of this type have only been effected at undesirably high reaction temperatures, namely, 80°–280° C. Also, under the prior art reaction conditions, the preparation of mono-esters of polyhydric alcohols has been complicated by the esterification of secondary hydroxyl groups, in addition to the esterification of primary hydroxyl groups, in the presence of alkali metal hydroxide catalysts; the esterificaiton of secondary hydroxyl groups under such conditions is shown, for example, by the fact that rearrangement of tri-glycerides is effected in the presence of such catalysts.

Contrary to the prior art, the process of this invention can be effected without heating, the reactions going to completion at room temperature during periods of up to 1 hour. Under the reaction conditions of this invention secondary hydroxyl groups are not esterified; and the production of mono-esters is readily achieved. This is a particularly desirable result, since, for plasticization of rubbers and resins, the mono-esters are the most satisfactorily compatible of the fatty acid esters.

An object of this invention is to provide a process for the preparation of mono-esters of hydroxy fatty acids with polyhydric alcohols. A further object is to provide a process which enables such esterification reactions to go to completion with little or no heating in minimal time. Another object is to provide a process for the production of the indicated mono-esters with a minimal free fatty acid content. Other objects and advantages of the invention will be apparent from the following description.

In carrying out this invention, the desired mono-esters are prepared by the direct reaction of tri-glyceryl esters of hydroxy fatty acids having from about 11 to about 22 carbon atoms per molecule with polyhydric alcohols having a maximum of one primary hydroxyl group per molecule in the presence of an alcoholysis catalyst chosen from the group comprising alkali metal hydroxides and alcoholates. The starting tri-glyceryl esters may be natural or synthetic materials, and are preferably liquid at the reaction temperature. Suitable esters in this category include castor oil, hydrogenated castor oil having an iodine number of not less than about 70, castor oil which has been oxidized, e.g., by air-blowing, and tri-glyceryl esters of other hydroxy fatty acids, such as those which may be synthesized by the hydroxylation of naturally occurring unsaturated glyceride oils, e.g., soybean oil, linseed oil, and the like, as by the peracetic acid method.

It is necessary that the tri-glyceryl esters used in the process of this invention be substantially neutral, and, in any case, that they have a free fatty acid content of less than about 0.8%. An exceptionally good product is obtained when the free fatty acid content of the starting ester is less than about 0.1%. This condition can be achieved readily, e.g., by the method disclosed in Colbeth U.S. Patent 2,249,746.

The polyhydric alcohol to be esterified by the process of this invention should contain a maximum of one primary hydroxyl group and at least one secondary hydroxyl group. Polymers of these alcohols which have the indicated characteristics may also be used. Typical polyhydric alcohols which are suitable for use in the process of this invention include 1,2-propane diol, 1,2-butane diol, 1,3-butane diol, 2-methyl-1,2-propane diol, 1,2,3-butanetriol, 1,2-pentanediol, 1,4-pentanediol, 1,2,-3,4,5-hexanepentol (rhamnitol), and 2-ethyl-1,3-hexanediol.

The molar ratio of the polyhydric alcohol to the tri-glyceryl ester is rather critical, and should be in the range from about 4.5 to 1 up to about 9 to 1. When the reactants are present in ratios within the indicated range, the reaction proceeds rapidly to completion.

The reactants in the process of this invention should be substantially anhydrous. The presence of water in the reaction zone results in higher percentages of free fatty acids in the product; for most purposes, it is desirable that the finished ester have a minimum free fatty acid content. The presence of water also slows the reaction.

The process of this invention is carried out in the presence of a catalyst. This catalyst is an alkali metal hydroxide, such as lithium hydroxide, sodium hydroxide, and potassium hydroxide, or an alkali metal alcoholate, preferably of one of the lower monohydric alcohols. The amount of catalyst required to effect the desired reaction is from about 0.01% to about 1.0%, based on the weight of the tri-glyceryl ester. It is desirable to use the hydroxide catalyst in the form of a concentrated solution (50% or more) of the catalyst in water.

Reaction temperatures for the process of this invention are from about 20° to about 50° C. At lower temperatures, the reaction proceeds so slowly as to be uneconomical. The use of higher temperatures causes loss of catalyst due to saponification, with deleterious amounts of soap being formed.

The time required for the completion of the process of this invention varies, depending upon the exact conditions used, from about 30 to about 90 minutes. The physical constants of the pure ester products of this invention can be determined, and set up as standards for determination of whether a particular reaction has gone to completion.

When the control tests show that the esterification reaction is substantially complete, the reaction mixture may be worked up in any desired manner. A preferred method involves the addition of sufficient phosphoric acid to neutralize the alkaline catalyst and to provide a slight excess of acid so as to reduce the emulsification tendencies when water is added at a later stage in the processing. Other suitable acids for use in this neutralization step are boric acid, acetic acid, and other weak acids having dissociation constants in the range from about $10^{-2}$ to about $10^{-11}$.

The neutralized product is desirably freed from glycerine, unreacted polyhydric alcohol, alkali metal salt, and any soap present by water-washing. This can be effected by simply mixing large volumes of water with the neutralized reaction mixture, and separating the aqueous layer which results by gravity. Or, the reaction product may be washed countercurrently with water in an apparatus such as that of Colbeth U.S. Patent 2,249,746. Spray washing may be resorted to when the reaction mixtures show tendencies toward emulsification with water. This washing technique may also be applied to unneutralized reaction mixtures. However, if the temperature of the reaction mixture is to be elevated in connection with the recovery of the mono-ester product, as when distillation is utilized for the separation of the unreacted alcohol, it is best to neutralize the product before the temperature is raised; in this way, there is no tendency for degradation of the reaction product in the presence of the catalyst at the elevated temperature. The indicated distillation step is preferably effected under vacuum and with the use of sparging steam.

The claimed process is not satisfactorily applicable to polyhydric alcohols having more than one primary hydroxyl group, since, with such alcohols, difficulties are encountered with the reaction rate and the completeness of the reaction. An acid catalyst is undesirable in the claimed reaction, since the use of such a catalyst results in at least partial dehydration of the secondary hydroxyl groups of the polyhydric alcohol and of the hydroxy fatty acid, as well as causing esterification of some of the secondary hydroxyl groups.

The mono-esters formed by the process of this invention, together with their acylation products, are highly suitable for use as plasticizers. Advantage can be taken of the fact that the mono-esters are hydroxyl-rich compounds which are quite useful as chemical intermediates, the following reactions giving an indication of their utility in this respect: the formation of alkyd resins by reaction with polycarboxylic acids and, if desired, polyhydric alcohols; sulfation; iso-cyanate coupling; acetalization; oxidation; amination; condensation with urea derivatives to form allophanates; esterification with phosphoric or phosphorous acids; and the like.

The following examples are given to illustrate the invention, but it is to be understood that the invention is not limited to these examples.

*Example 1.*—300 parts by weight of castor oil were mixed with 225 parts by weight of 1,2-propanediol; the latter contained 0.3% of dry sodium hydroxide, based on the weight of the castor oil, this sodium hydroxide having been dissolved in the propanediol by warming. The castor oil had a free fatty acid content of 0.22%. The molar ratio of propanediol to castor oil was 9:1, which is 3 times the theoretical requirement, or a 200% excess of propanediol. The reaction mixture was maintained at 25°–30° C. for one hour, and then was allowed to stand at room temperature overnight. Separation of the desired product, 2-hydroxypropyl ricinoleate, was effected by water-washing of the reaction product, salt water being used for the first wash to eliminate emulsifying tendencies. The product, on drying, was found to have a saponification value of 158.3, the theoretical saponification value being 158.5. The closeness of these two values is indicative of practically 100% esterification to form the desired product, since any unreacted castor oil (saponification value 180) would not be removed by the water-washing, and the presence of any appreciable quantity of unreacted oil would have a noticeable effect on the saponification value of the product. Other properties of the product are:

Refractive index @ 25° C. _____ 1.4701
Specific gravity @ 25° C./25° C. _____ 0.957

*Example 2.*—This was similar to Example 1, except that the catalyst was a 50% solution of sodium hydroxide in water; this catalyst solution was found to dissolve in the propanediol much more readily than did the dry sodium hydroxide. The properties of the product of this example are:

Saponification value _____ 158.7
Refractive index _____ 1.4711
Specific gravity _____ 0.960

*Example 3.*—This was similar to Example 1, except that the amounts of the reactants were multiplied by ten, and the catalyst was a 50% solution of sodium hydroxide in water, and was used in the amount of 0.6%, based on the weight of the castor oil. In the working up of the product, after the washing step, the ester was treated with Celite, a diatomaceous earth, and filtered. The properties of the product of this example are:

Saponification value _____ 158.0
Refractive index _____ 1.4694
Specific gravity _____ 0.955
Iodine value _____ 76.2

*Example 4.*—275 grams of 50% sodium hydroxide were dissolved in 75 lbs. of 1,2-propanediol, and the resulting solution was mixed with 200 lbs. of castor oil having a free fatty acid content of 0.3%. In this case, the molar ratio of propanediol to castor oil was 4.5/1; and the amount of catalyst was 0.15%, based on the weight of castor oil. The procedure followed was as in Example 1, except that the first two washes of the reaction product were effected with salt water. The properties of the product are:

Saponification value _____ 158.3
Refractive index _____ 1.4694
Specific gravity _____ 0.951
Iodine value _____ 75.5
Hydroxyl value _____ 288.5

*Example 5.*—8 ounces of 50% sodium hydroxide were dissolved in 39 lbs. 9 ozs. of 1,2-propanediol, and the resulting solution was mixed with 80 lbs. of castor oil having a free fatty acid content of 0.8%. The molar ratio of propanediol to castor oil was 6/1; and the amount of catalyst was 0.3%, based on the weight of the castor oil. The reaction mixture was agitated at room temperature for 20 minutes, at the end of which time a clear, one-phase reaction mixture was formed. The agitation was discontinued, and the reaction mixture was allowed to stand in the reaction kettle for 1 hour. The reaction mixture was then neutralized with phosphoric acid. The washing of the mixture was then effected by a spray technique, which consisted in directing a fine spray of water completely over the surface of the neutralized mixture. The soap and unreacted alcohol are preferentially soluble in the water; thus, the solution and consequent separation of these compounds were effected as the tiny drops of water fell to the bottom of the kettle. The use of this technique eliminated any tendency for emulsification during the washing step. The drying of the ester was carried out in a still, the bottoms temperature being no higher than 125° C. The dried product was passed through an Alsop filter, this operation resulting in a brilliant product having the following characteristics.

Saponification value _____ 159.6
Refractive index _____ 1.4700
Specific gravity _____ 0.960
Iodine value _____ 76.3
Hydroxyl value _____ 238.1

*Example 6.*—1.8 parts by weight of a 50% aqueous solution of sodium hydroxide were dissolved in 163.8 parts by weight of 1,2-propanediol; this solution was mixed with 300 parts by weight of castor oil. The molar ratio of propanediol to castor oil was 6.7/1; and the amount of catalyst was 0.3%, based on the weight of the castor oil. The reaction was effected at room temperature. The reaction mixture was allowed to stand overnight prior to neutralization with 1.7 parts by weight of phosphoric acid. The mixture was then washed 5 times with warm water and the ester product was dried under vacuum. This product had the following properties:

Saponification value _____ 160.6
Refractive index _____ 1.4699
Specific gravity _____ 0.958
Iodine value _____ 76.4

*Example 7.*—This example was similar to Example 6, with the exception that 182.4 parts by weight of 1,2- propanediol were used. The molar ratio of propanediol to castor oil was thus 7.4/1. The properties of the ester formed in this example were:

| | |
|---|---|
| Saponification value | 159.2 |
| Refractive index | 1.4690 |
| Specific gravity | 0.957 |
| Iodine value | 75.8 |

It was also noted that the color of the product of this example was lighter than that of the product formed in Example 6.

*Example 8.*—1.8 parts by weight of a 50% aqueous solution of sodium hydroxide were dissolved in 182.4 parts by weight of 1,2-propanediol; this solution was mixed with 300 parts by weight of castor oil. The molar ratio of propanediol to castor oil in this example amounted to 7.4/1; the amount of catalyst was 0.3%, based on the weight of castor oil. The reaction was carried out at 40° C. for 1 hour. Neutralization of the mixture was then effected with 1.6 parts by weight of phosphoric acid. This was followed by several water washes, and the ester product was dried under vacuum. The properties of the ester formed in this example were:

| | |
|---|---|
| Saponification value | 161.5 |
| Refractive index | 1.4708 |
| Specific gravity | 0.960 |
| Iodine value | 77.3 |

*Example 9.*—100 parts by weight of castor oil were mixed with 90 parts by weight of 1,3-butanediol containing 0.3% of sodium hydroxide (used as a 50% aqueous solution), based on the weight of castor oil. This catalyst dissolved in the butanediol without difficulty. When the castor oil was added to the butanediol, the mixture became quite hazy, but turned clear within about 1 hour at room temperature. Excess alcohol and other water-soluble components were then washed out, and the product was dried. The resulting ester, 3-hydroxy butyl ricinoleate, has a theoretical saponification value of 153.0. The properties of this example were:

| | |
|---|---|
| Saponification value | 149.1 |
| Refractive index | 1.4692 |
| Specific gravity | 0.960 |

*Example 10.*—The tri-glyceride of dihydroxyoleic acid and 2-ethyl-1,3-hexanediol were mixed in a glycol: tri-glyceride molar ratio of 8/1. The tri-glyceride contained 0.25% of free fatty acid. Potassium hydroxide was used as the catalyst for this reaction in the form of a 75% aqueous solution; this catalyst was dissolved in the glycol, and was used in the amount of 1%, based on the weight of tri-glyceride. The reaction was carried out at 50° C. for 1 hour, and the mixture was then neutralized with boric acid and spray-washed. The ester product was dried under vacuum. The theoretical saponification value for the product of this reaction, 3-hydroxy-2-ethyl-hexyl dihydroxyoleate, is 126.9, and the observed value for the product of this example was 126.3.

*Example 11.*—The tri-glyceride of ambrettolic acid (free fatty acid content: 0.11%) and rhamnitol were mixed in a polyhydric alcohol: tri-glyceride molar ratio of 8.5/1. The catalyst, a 50% aqueous solution of lithium hydroxide, was dissolved in the polyhydric alcohol, and was used in the amount of 0.75%, based on the weight of the tri-glyceride. The reaction was carried out at 35° C. for 1 hour. The product was worked up as in Example 10. The theoretical saponification value of the ester product, rhamnitol monoambrettolate, is 134.1, while the observed saponification value of the product of this example was 134.8.

*Example 12.*—Partially hydrogenated castor oil having an iodine value of 70 and a free fatty acid content of 0.32% was mixed with 1,3-butanediol in a glycol:tri-glyceride molar ratio of 5.5/1. The catalyst, sodium methylate, was dissolved in the butanediol, and was used in an amount of 0.2%, based on the weight of castor oil. The reaction was carried out at 20°–25° C. for one hour, and the product was worked up as in Example 10. The theoretical saponification value for the product of this reaction, the mono-ester of butanediol and partially hydrogenated castor oil fatty acids, is 152.8, while the saponification value observed for the product of this example was 152.5.

*Example 13.*—The tri-glyceride starting material for this example was prepared by the peracetic acid oxidation of soybean oil, followed by the hydrolytic removal of the resulting acetyl group, to form a partially hydroxylated soybean oil having an iodine value of 40.3 and a free fatty acid content of 0.56%. The polyhydric alcohol, 1,3-butanediol, containing the dissolved catalyst, potassium ethylate, in an amount of 0.4%, based on the weight of the tri-glyceride, was mixed with the hydroxylated oil in a glycol:tri-glyceride molar ratio of 8.5/1. The reaction was conducted at 30° C., and was completed in 1 hour. The reaction product was worked up as in Example 10. The product of this reaction, the mono-ester of butanediol with hydroxylated soya fatty acids, has a theoretical saponification value of 142.9, while the observed saponification value of the product of this example was 143.7.

*Example 14.*—The tri-glyceride of undecylenic acid was hydroxylated by the method used in connection with Example 13 to yield a product having an iodine value of 49.7 and a free fatty acid content of 0.36%. This hydroxylated tri-glyceride was mixed with 1,2-propanediol containing 0.3% of lithium propylate, based on the weight of the tri-glyceride; the glycol:tri-glyceride molar ratio was 4.5/1. The reaction was conducted with agitation for 50 minutes at 20° C., and the product was worked up as per the method of Example 10. The product of this reaction, the mono-ester of propanediol with hydroxylated undecylenic acid has a theoretical saponification value of 214.6, while the observed saponification value of the product of this example was 215.3.

*Example 15.*—Hydroxylated rape seed oil, hydroxylated as per Example 13, having an iodine value of 44.6 and a free fatty acid content of 0.71%, was mixed with 1,2-propanediol, containing 0.3% of sodium hydroxide, based on the weight of the oil and added in the form of a 50% aqueous solution, in a glycol:oil molar ratio of 7.5/1. The alcoholysis reaction was effected at 35° C. and was continued for 1 hour. The product was then worked up as indicated in Example 10. The product of this reaction, the mono-ester of propanediol and hydroxylated rape fatty acids, has a theoretical saponification value of 146.4, while the observed saponification value of the product of this example was 145.2.

*Example 16.*—Hydroxylated herring oil, obtained as per the method of Example 13, having an iodine value of 43.7 and a free fatty acid content of 0.67%, was mixed with 1,2-propanediol containing 0.3% of sodium hydroxide, based on the weight of the oil, and added in the form of a 50% aqueous solution, in a glycol:oil molar ratio of 7.5/1. The reaction was conducted at 25°–30° C. for 1 hour, and the reaction products were then worked up as in Example 10. The product of this reaction, the mono-ester of propanediol and hydroxylated herring fatty acids, has a theoretical saponification value of 149.2, while the observed saponification value of the product of this example was 148.7.

It will be seen from the foregoing examples that the alcoholysis reaction of this invention is applicable to a variety of hydroxylated oils. That the reaction proceeds to completion at low reaction temperatures and in short reaction times is indicated by the close correspondence between the theoretical and observed saponification values of the mono-ester products.

PREPARATION OF ACETYLATED ESTERS

*Example 17.*—The product of Example 3 was acetylated with an equal volume of acetic anhydride to form 2-acetoxypropyl acetoxy-ricinoleate. The acetylated ester had the following properties, the theoretical saponification value of this ester being 371:

| | |
|---|---|
| Saponification value | 371.9 |
| Refractive index | 1.4558 |
| Specific gravity | 0.970 |
| Iodine value | 61.7 |

*Example 18.*—The product of Example 9 was acetylated with an equal volume of acetic anhydride, yielding 3-acetoxybutyl acetoxy-ricinoleate. The properties of this acetylated ester were as follows, the theoretical saponification value being 359:

| | |
|---|---|
| Saponification value | 359.9 |
| Refractive index | 1.4579 |
| Specific gravity | 0.971 |

*Example 19.*—The data in the accompanying table demonstrate the utility of the product of Example 17 (2-acetoxypropyl acetoxy-ricinoleate) as a polyvinyl chloride plasticizer. Data on two standard plasticizers, dioctyl phthalate and methyl acetoxy-ricinoleate, are included for comparison. Films of the indicated compositions were prepared in the usual manner on a three-roll mill. All of the compositions processed well, no differences between them being experienced as to processing properties or action during milling, or while removing the test films from the mill rolls. The low volatility indicated for the product of Example 17 (column A; and, in blends with dioctyl phthalate, columns D and E) is a highly desirable property. The figures reported in the table for heat aging are based on a scale ranging from 0 to 9, 0 representing the best properties and 9, the poorest. Thus, under flexibility, 1 indicates "good hand"; 3, "very slightly stiff"; 5, "slightly stiff"; and 8, "very stiff"; under opaqueness, 0 represents "clear"; 1, "very slightly hazy"; and 5, "hazy." The heat stability data were obtained by milling the compositions for 30 minutes at 340° F., and taking colorimeter readings on the resulting films after they had stood for 24 hours at room temperature. Then reported colorimeter readings are absorption coefficients, and are independent of the thickness of the films; the higher the readings, the darker is the color of the film. On exposure to ultra violet light for 300 hours (not reported in the table), all of the films were identical as regards color formation and degradation.

Table

| | A | B | C | D | E | F | G |
|---|---|---|---|---|---|---|---|
| Polyvinyl chloride | 100 | 100 | 100 | 100 | 100 | 100 | 100 |
| 2-Acetoxypropyl acetoxy-ric | 43 | | | 13 | 21.5 | | |
| Me acetoxy-ric | | 43 | | | | 13 | 21.5 |
| DOP | | | 43 | 30 | 21.5 | 30 | 21.5 |
| BVS | 1.5 | 1.5 | 1.5 | 1.5 | 1.5 | 1.5 | 1.5 |
| Volatility (5 days at 212° F.) percent loss | 8.9 | 70.1 | 39.1 | 23.0 | 22.4 | 38.1 | 54.2 |
| Heat Aging (12 mil film) (5 days at 212° F.): | | | | | | | |
| Flexibility | 1 | 8 | 3 | 1 | | 5 | |
| Opaqueness | 0 | 0 | 1 | 1 | | 5 | |
| Heat Stability, K-value (24 hrs.) | 6.0 | 11.2 | 10.0 | | 7.0 | | 9.0 |

NOTE.—BVS is a modified barium ricinoleate, and is incorporated as a stabilizer.

*Example 20.*—Similar results were noted when the product of Example 18 was tested as a polyvinyl chloride plasticizer. The volatility of this ester was 11.4%, as determined with a composition corresponding to that shown for Example 19-A; the striking improvement over the corresponding volatility figures reported, under Example 19, for dioctyl phthalate and methyl acetoxy-ricinoleate is noteworthy. The heat stability values for the composition containing the product of Example 18 (corresponding to composition shown for Example 19-A) and a composition containing a 50/50 blend of that product and dioctyl phthalate (corresponding to Example 19-E) were 6.0 and 7.0, respectively; these values, having been obtained by the same method, are strictly comparable to those reported in Example 19.

Thus, the present invention provides a selective process for the production of mono-esters of hydroxy fatty acids with polyhydric alcohols, which process goes rapidly to completion at low temperatures. Also, the products of this invention and their derivatives have great utility as plasticizers and, as compounds rich in hydroxyl groups, for use in hydraulic fluids for sulfation, and for related applications.

Numerous modifications and variations in the invention described herein will be apparent to those skilled in the art, and are within the spirit and scope of the appended claims.

What is claimed is:

1. The process for the production of the mono-esters of a hydroxy fatty acid having from about 11 to about 22 carbon atoms per molecule with a polyhydric alcohol containing a maximum of one primary hydroxyl group and at least one secondary hydroxy group, hydroxyl groups in the latter category undergoing substantially no esterification in said process, which comprises reacting said polyhydric alcohol with a tri-glyceryl ester of said hydroxy fatty acid containing not more than 0.8% of free fatty acids, said tri-glyceryl ester being liquid at the reaction temperature, 4.5 to 9 parts of said polyhydric alcohol being used to each part of tri-glyceryl ester under substantially anhydrous conditions at a temperature in the range from 20° to 50° C. and in the presence of from 0.01% to 1.0% of an alcoholysis catalyst chosen from the group comprising alkali metal hydroxides and alcoholates, based on the weight of tri-glyceryl ester used.

2. The process of claim 1, in which said polyhydric alcohol is 1,2-propanediol.

3. The process of claim 1, in which said polyhydric alcohol is 1,3-butanediol.

4. The process of claim 1, in which said hydroxy fatty acid has 18 carbon atoms per molecule.

5. The process of claim 1, in which said tri-glyceryl ester is castor oil.

6. The process of claim 1, in which said tri-glyceryl ester is partially hydrogenated castor oil, the iodine value of said oil being not less than about 70.

7. The process of claim 1, in which said tri-glyceryl ester is the product of hydroxylation of a naturally occurring glyceride oil, the iodine value of said oil being not less than about 40.

8. The process of claim 1, in which the reaction product is neutralized with an acid having a dissociation constant in the range from about $10^{-2}$ to about $10^{-11}$, the neutralized product is freed from glycerine, polyhydric alcohol, alkali metal salt, and any soap present by water-washing, and the resulting purified mono-ester is dried.

9. The process of claim 1, in which the reaction time is about one hour.

No references cited.

UNITED STATES PATENT OFFICE
CERTIFICATE OF CORRECTION

Patent No. 2,902,500                        September 1, 1959

Malcolm Kent Smith

It is hereby certified that error appears in the printed specification of the above numbered patent requiring correction and that the said Letters Patent should read as corrected below.

Column 4, line 13, Example 4, for "content of 0.3%" read -- content of 0.39% --.

Signed and sealed this 8th day of March 1960.

(SEAL)
Attest:

KARL H. AXLINE
Attesting Officer

ROBERT C. WATSON
Commissioner of Patents